United States Patent [19]

Turner

[11] Patent Number: 5,022,557

[45] Date of Patent: Jun. 11, 1991

[54] COMPUTERIZED BEVERAGE DISPENSING SYSTEM

[76] Inventor: Charles S. Turner, 12323 Creekspan, Dallas, Tex. 75243

[21] Appl. No.: 410,313

[22] Filed: Sep. 20, 1989

Related U.S. Application Data

[63] Continuation-in-part of Ser. No. 281,846, Dec. 8, 1988, Pat. No. 4,979,641, which is a continuation-in-part of Ser. No. 87,258, Aug. 19, 1987, abandoned.

[51] Int. Cl.$^5$ .............................................. B67D 5/08
[52] U.S. Cl. .................................. 222/54; 73/861.42; 222/59
[58] Field of Search .................. 222/23, 37, 54, 59, 222/639, 640–641, 71; 73/861.42, 861.44, 861.52

[56] References Cited

U.S. PATENT DOCUMENTS

| | | | |
|---|---|---|---|
| 3,666,143 | 5/1972 | Weston | 222/641 X |
| 3,718,233 | 2/1973 | Nordhoff | 222/641 |
| 3,813,008 | 5/1974 | Olson | 222/641 |
| 4,004,715 | 1/1977 | Williams et al. | 222/30 |
| 4,111,243 | 9/1978 | Fetterman | 222/641 X |
| 4,646,940 | 3/1987 | Kramer et al. | 222/1 |
| 4,821,580 | 4/1989 | Jorritsma | 73/861.42 |

FOREIGN PATENT DOCUMENTS

| | | | |
|---|---|---|---|
| 1239520 | 6/1986 | U.S.S.R. | 222/640 |
| 2094269 | 9/1982 | United Kingdom | 222/641 |
| 2101089 | 1/1983 | United Kingdom | 222/641 |
| 2221209 | 1/1990 | United Kingdom | 222/23 |

*Primary Examiner*—Donald T. Hajec

[57] ABSTRACT

A beverage dispensing means includes a pressurized beverage container, a flow meter connected between the pressurized container and a faucet. A valve assembly is attached to the faucet for opening and closing the faucet responsive to an electromechanical actuator. A programmable controller in response to differential pressure indicating signals produced by the flow meter determines the flow rate incrementally and the incremental quantities are accumulated for comparison with a preselected programmed quantity for pouring a preselected quantity of the beverage and actuates the electromechanical actuator for the time necessary to pour the selected amount of beverage. The flow meter includes a line segment of known length, size and material. The known length provides a measurable pressure difference owing to the drag therein as opposed to the measurable pressure difference obtained from the head of a manometer type flow meter. Thus, a substantially larger difference pressure measurement is obtainable. A differential pressure transducer is connected to passageways connected to line segment ports located at beginning and ending points of the line segment for measuring the pressure differential and outputting electrical signals indicative thereof for use by the programmable controller in determining continuously during the pouring time the quantities for a preselected amount of the beverage. The valve assembly includes a valve stem sleeve attached between the faucet ends. The sleeve includes at the end adjacent to the faucet a seal expander for wiping clean during valve cleaning the portion of the valve stem exposed to the beverage during valve opening. This prevents seepage of the beverage into the valve sleeve where it can solidify to stick the valve.

11 Claims, 3 Drawing Sheets

COMPUTERIZED BEVERAGE DISPENSING SYSTEM

This invention is a continuation-in-part of patent application Ser. No. 281,846 filed Dec. 8, 1988, now U.S. Pat. No. 4,979,641, for Computerized Beer Dispensing System which is a continuation-in-part of patent application Ser. No. 087,258 filed Aug. 19, 1987, now abandoned, for a Computerized Beer Dispensing System.

This invention relates to beverage dispensing devices and more particularly to a draft beer dispenser.

BACKGROUND OF THE INVENTION

In prior beverage dispensing devices substantial quantities of beverages have been lost through spillage resulting from malfunctioning valves. Also customer dissatisfaction with automatic beverage dispensing devices especially automatic beer dispensers has resulted from their failure to pour consistently preselected quantities.

Beverage dispensing devices and beer dispensing devices in particular have in common a faucet or shank forming a passageway for connection to a beverage source through flexible tubing and a beverage outlet spout. A valve seat is provided within the faucet for seating a sealing member. A valve housing has a first end in open communication with the valve seat, and an opposing open end to which a valve actuator ball pivot is threadedly attached. A valve stem contained in the housing interconnects the sealing member to the valve actuator. One end of the valve stem is connected to the sealing member; the opposite end of the valve stem is provided with a pair of spaced pistons. The actuator lever has an end connected between the spaced pistons of the valve stem. Thus, the valve actuator engages the pistons to seat and unseat the sealing member. A problem with these devices is that in disassembling the valve for cleaning and reassembling the device the actuator can be overtightened thereby increasing the force required to operate the valve.

In known valve designs there is no seal to prevent the beverage from entering the piston/housing area. The beverage over a period of time evaporates and leaves a solid residue which builds up to retard operation of the valve actuator. If the residue is not removed the pistons will seize. Beer is particularly bad. The yeast and other solids in beer solidify with time. During solidification increasing force is required for the actuator to open and close the sealing member. Thus, periodically the actuator must be removed, the valve disassembled and the pistons and cylinder cleaned to prevent complete immobilization of the valve and the formation of harmful bacteria.

In automatic beverage dispensing systems such as automatic beer dispensers, the actuator is connected to a computer controlled solenoid. This additional structure adds to the difficulty in disassembling the faucet for cleaning. Further, with the need for increasing valve operating pressure, careful control of the temperature and pressure cannot prevent variations in the amount poured. To achieve commercial success for automatic beverage dispensing systems, various approaches to the cleaning problems have been made.

An approach for solving the cleaning problem has been to design the faucet to facilitate disassembly. This approach included the addition of quick release couplers for mounting the housing on the faucet and a slip joint connection between the electrically powered valve-operated part and the valve stem. These features allow unobstructed access to the valve stem when the dispenser is removed from the system. Those persons skilled in the art desiring more information about such a dispenser are referred to U.S. Pat. No. 4,111,243 issued Sept. 5, 1978 to Fetterman. While this approach provides easy access to the valve for cleaning, no structure is included to prevent solid buildup in the valve which causes the sticking problem.

Another approach to the problem was to design a faucet so as to reduce the force required to operate the valve. In this approach the valve housing is provided with a pair of spaced O-rings formed of a low friction material (polytetrafluoroethylene). These O-rings engage the spaced pistons of the valve stem on both sides of the actuator lever. Thus, the diameters of the spaced pistons can be reduced to increase the space between the pistons and cylinder, and to reduce the force necessary to manipulate the valve stem between the flow preventing and flow permitting positions. Those persons skilled in the art desiring more information about this structure are referred to U.S. Pat. No. 3,718,233 issued Feb. 27, 1973 to Nordhoff. A problem with this structure lies in the required positioning of the O-rings. The O-rings are positioned well within the cylinder area. Thus, although seepage is reduced between the O-rings, damaging build up of solids on the stem areas which extend into the valve housing beyond the O-rings can occur. This buildup of solids will ultimately result in the sticking of the valve.

For customer acceptance of automatic beverage dispensers, it is essential that the amount of beverage poured be accurate. Pressure and temperature are factors which contribute substantially to the pouring accuracy of automatic beverage dispenser systems. It is well known that liquid of any kind flowing in a line meets resistance to flow, or "drag". Drag in a line is a function of the size, material, and interior smoothness. Thus, drag results in a continuous drop in pressure throughout the total line length and is measured in pounds per square inch per inch. Changes in applied pressure at the beginning of a line of fixed length, size, and material results in a change in the rate of flow of liquid in the line; however, because of drag the flow of a liquid in the line is not linear. Thus, doubling the applied pressure will result in less than twice the rate of flow and correspondingly, reducing the applied pressure by one half of the previous setting will result in a reduction in flow of less than fifty percent. As the flow rate of fluid in a line is not linear and is dependent on the physical properties of the line it is difficult to measure a quantity based on pressure and temperature alone.

One means for accurately determining the quantity dispensed is to use pressure transducers to measure the flow rate of the liquid and calculate the time required to dispense a preselected quantity. Pressure sensors for flow meters, however, are very sensitive to pressure shock. Any sudden increase in pressure on one side of a differential pressure transducer will damage most pressure transducers. Sudden pressure increases exist as shock waves (water hammer) when a flowing liquid is abruptly stopped by the substantially instantaneous closing of the valve. Further, with existing flow meters the pressure difference transducers, such as those used in manometers, measure pressure differences indicated by difference in head measurements which are very small and required a substantial amount of amplification.

SUMMARY OF THE INVENTION

Accordingly it is an object of the invention to provide an improved automatic beverage dispensing system.

Another object of the invention is to provide an automatic beverage dispensing system having an improved valve for eliminating substantially the formation of valve operating sticking solids.

Yet another object of the invention is to provide an automatic beverage dispensing system which is easily cleaned without disassembling the valve.

Still another object of the invention is to provide a valve actuator whose operating force is independent of cleaning operations.

A further object of the invention is to provide an automatic beverage dispensing system having a substantially improved flow meter for measuring the flow rate of the beverage for use in determining the valve operating time to pour consistently preselected amounts of the beverage.

Briefly stated the automatic beverage dispensing system of the invention includes a pressurized beverage container, and a flow meter connected between the container and a faucet. The faucet has a passageway through it including a valve seat and an outlet spout. A valve mechanism includes a valve stem having at one end a sealing member adapted to seat in the valve seat to open and close the passageway. An actuator drives the valve mechanism and a programmable controller controls operation of the actuator in response to time signals developed from pressure difference measurements of the flow meter.

In accordance with one feature of the invention, an improved valve mechanism is provided which precludes entry of beverages into the working parts of the valve mechanism where they form solids. The solids jam the working parts of the valve mechanism to seize the valve mechanism. The valve mechanism, which will be described in detail hereinafter, includes a valve stem having a sealing member attached to one end adapted to seat in the valve seat of the faucet for opening and closing the passageway. A seal assembly is attached to the faucet and has a gasket at an end adjacent to the passageway for slidably receiving a body portion of the valve stem. The portion of the valve stem subjected to the beverage passing through the passageway during the time the valve is open is wiped clean by the gasket of the seal assembly as it enters the seal assembly during valve closure. Further, a rocker arm type drive attached to drive the valve stem at its end replaces the ball and socket type drive.

In accordance with another feature of the invention, an improved flow meter is provided which utilizes drag (friction) existing in any line segment of known length, size, and material and containing a flowing fluid to measure precisely the drop in pressure. The pressure drop is used to determine a flow rate, and subsequently converting the flow rate to a known precise quantity through an accurate time measurement. The flow meter includes a pressure differential transducer connected across the line segment to measure the drop in pressure across the known length of line. Thus, the pressure drop is independent of the total line length or position in the line where the fixed length is placed. Further, as a pressure differential exists only when the beverage is flowing the beverage container's pressure is canceled including any excess keg pressure at the pressure differential transducer.

Also, any shock wave generated as a result of any sudden is canceled. This is because any shock wave generated is received substantially simultaneously on both sides of the pressure differential transducer through the line ports and is canceled. As the pressure differential transducer or other differential measuring device is not subjected to beverage container pressure or shock waves, very sensitive devices can be utilized to measure pressure differentials and produce signals of greater magnitude for improved accuracy. A computer compares the measured pressure differential to stored flow rates (look up table) to obtain a corresponding flow rate for computing continuously the amount of beverage being poured and closing the valve when the desired amount has been dispensed. The computer also controls the frequency at which the pressure differential measurements are taken; the higher the frequency the more accurate the quantity measurement.

BRIEF DESCRIPTION OF THE DRAWINGS

Other objects and features of the invention will become more readily apparent from the following detailed description when read in conjunction with the accompaying drawings, in which.

DETAILED DESCRIPTION OF THE INVENTION

The automatic beverage dispensing system constituting the subject matter of the invention will be described as an automatic beer dispensing system for purposes of description only and not by way of limitation.

Figure 1:
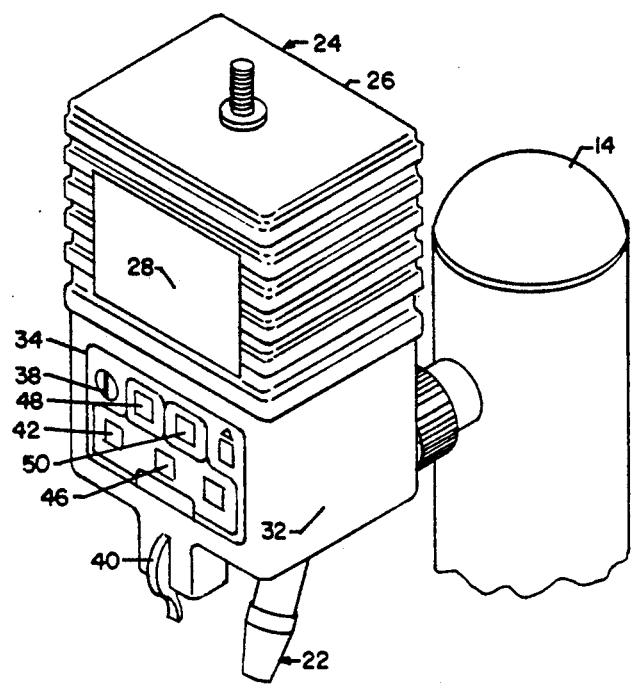
FIG. 1 is an isometric view of the automatic beverage dispenser constituting the subject matter of the invention.

The automatic beer dispensing system 10 (FIG. 1), includes a housing 12 (FIG. 2) for a carbon dioxide bottle and one or more kegs of beer (not shown), a stanchion 14, a refrigerator unit (not shown) for cooling the beer kegs and stanchion, and a sink type support (not shown) for supporting beer receptacles. The carbon dioxide bottle is connected to a keg of beer for pressurization. A flexible tube 16 (FIG. 4) connects a keg of beer to a flow meter 18, hereinafter described in detail, and a flexible tube 20 connects the flow meter 18 to the stanchion 14 (FIG. 1). A faucet 22 (hereinafter described in detail) is attached to the stanchion, and a housing 24 is connected to the faucet.

The housing 24 may include a top compartment 26 having a display panel 28 and a computerized controller 30 (FIG. 5), and a bottom compartment 32 (FIG. 1) having a front panel 34, and a keypad 36. These elements are combinable in a single compartment. The front panel 34 includes a plurality of operation selection switches taken from a group including a key switch 38, and a glass dispensing switch 40. The key switch 38 is either a normal/program switch or an on/off/purge switch. In the former a purge operation is provided when in the program mode. The keypad 36 includes a plurality of push buttons taken from the group including a mug button 42, a pitcher button 44, head control button 46, cancel button 48, repeat pour button 50, and a display button 52.

The display panel 28 is an electronic display which may be, for example, a vacuum fluorescent display (FG 12A2 manufactured by Nartoke Inc.) or a typical LED display. The displays are for displaying all the programmed functions provided and their on going status for constant monitoring and viewing.

In the embodiment shown in FIG. 1, the off/on/purge key switch 38 turns the unit on. There are two keys with each unit, the operations key and the master key. The operations key only will turn the unit from off to on. The master key will turn to all three positions. This provides operation control of the unit.

The off positions shuts the power off to a faucet operating solenoid to preclude any dispensing. The display panel will read SYSTEM OFF when in the off position.

The on position activates the system for service and if all systems are normal will display a programmed message on the screen to this effect. However, if the temperature or pressure readings are out of proper operating parameters, the problem will be identified by a flashing message on the display screen for alerting one to the special problem for corrective action.

In the purge position the master key cannot be removed from the unit until it is turned back to the off or on position and therefore should not be out of reach of an authorized carrier during the purging or programming mode.

In either the on/off/purge key switch or the normal/program key switch designs, the purge mode is provided for cleaning the system. In the purge mode all of the functions will operate permitting a cleansing solution to be flushed through the system, without disassembling the system and in particular the valve.

The glass function switch 40 is adapted for actuation by pressing against the inside rim of a glass. During normal operation, this pressure activates the unit to dispense a specific size glass of beer. The word GLASS is displayed on the display to confirm the glass selection.

In the programming mode, the keypad is used to program, among other things, the quantity to be used in filling a glass, mug, or pitcher.

To obtain a mug of beer, a pitcher of beer, or to reform a head of foam on a glass, mug, or pitcher of beer, respectively, the mug function button 42, pitcher function button 44, or the head button 46 is pressed while holding a container for the beer selection under the faucet. Pressing these buttons will activate the unit and dispense a specific size mug, or pitcher of beer or a head of foam on the glass, mug, or pitcher. The display will display the word MUG, PITCHER, or HEAD in accordance with the selection. Even though the selected button is held in the pressed position, only one beer or head will be poured for the selected container. To dispense another mug or pitcher or head of foam, the appropriate button must be released and pressed again. Nevertheless, repeated mug, pitcher or head dispensing may be provided using the repeat function button 50.

The cancel function button 48 may be pressed to immediately deactivate the system and terminate any current operation. No count will be recorded for the canceled item, but one count will be recorded under the cancel function, the total number of ounces poured prior to activating the cancel button computed, and the total number of ounces recorded. This function is recallable under CANCEL OZS. when the display function is activated.

Those persons skilled in the art desiring more information concerning the functions, and the programming of the programmable controller to perform these functions are referred to the above mentioned patent application, Ser. No. 281,846.

FAUCET

Figure 2:
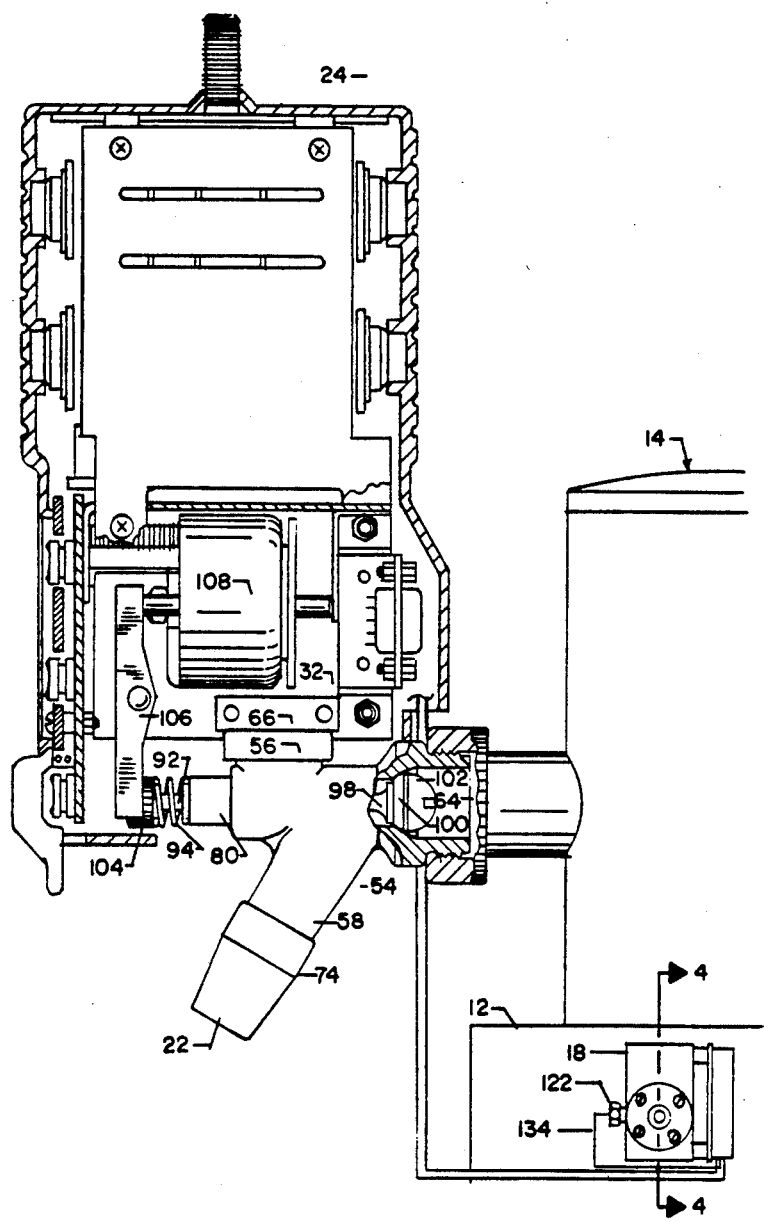
FIG. 2 is a view of the automatic beverage dispenser of the invention having a portion broken away to show the component parts of the faucet.

Referring now to FIG. 2, the faucet 22 includes a faucet assembly 54 attached to the compartmentalized housing 24 by a threaded faucet mounting plate 56. The faucet assembly includes a faucet 58. The compartmentalized housing 24 has an internally threaded faucet mounting plate 66 attached thereto for connecting the faucet 58 to the housing 32. The faucet includes a housing 60 (FIG. 3) having walls forming an externally threaded connector 62 for connecting the faucet to the faucet mounting plate, a passageway 64 for the beverage being dispensed, a valve stem passageway 66, and a valve seat 68 formed in the housing 60 in open communication with the passageways 64 and 66. The housing for passageway 64 has a connector 70 at a first end for connecting the faucet to the stanchion for conducting the beverage through the passageway to a second end having a connector 72 for attaching a faucet extension 74. The housing for the valve stem passageway has an end 76 having a connector 78 for receiving a valve stem seal assembly 80. The valve stem passageway 66, valve seat 68 and connector 70 are in axial alignment.

The seal assembly 80 includes a sealing sleeve 82 preferably of TEFLON having an end portion 84 for connection to the connector 76 of the valve stem passageway 66 of the faucet, and a valve stem guide 86 adjacent to the end 88 opposite the end portion 84. A coil spring support 90 is formed on the end 88. A seal expander spring 92 is mounted in the end portion 84 of the sleeve 82, and a coil spring 94 is mounted on the coil spring support 90.

A valve stem 96 is provided with a valve washer retainer 98 adjacent to a first end for retaining a valve washer 100. A valve stem screw 102 secures the valve washer to its retainer 98. The second or opposite end of the valve stem is provided with a bayonet type fastener to receive a coil spring retainer 104.

In operation, the valve stem with the valve washer attached is inserted bayonet end first through the faucet connector 70 end, valve seat 68, expander spring 92 and sleeve 82 of the sleeve assembly 80, and coil spring 94. Then the spring retainer 104 is screwed onto the bayonet end of the valve stem to retain the spring and to coact with the valve seat to retain the valve stem in the faucet. The valve stem has a highly polished bearing surface which forms with the seal assembly end a permanent barrier to prevent any seepage of beer between the stem and inside surface of the seal. Therefore, no buildup of yeast and beer solids can occur. The closing action of the valve wipes the beer from the stem surface as it passes through the seal; thus, always providing a dry polished surface in contact with the seal which eliminates the formation of solids and consequent sticking of the valve in either the open or closed position. The valve construction thereby permits interim cleaning of the faucet by flushing with a cleaning solution without disassembly.

A rocker arm 106 (FIGS. 2 and 3) is pivotally attached to a mount of the housing. The lower and upper end portions of the rocker arm engage, respectively, the valve stem retainer 104 and core of a solenoid 108. The programmable controller is connected to the solenoid for timing its operation to pour the selected quantity of beer.

Figure 4:
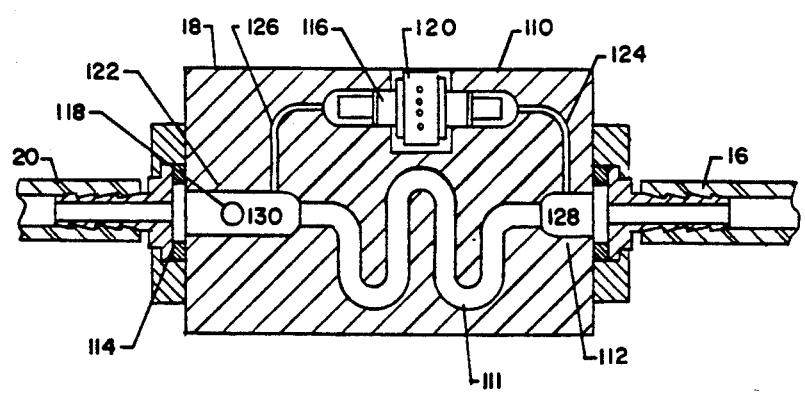
FIG. 4 is a cross sectional view of the flow meter taken along line 4—4 of FIG. 2.

Referring now to FIG. 4, the flow meter 18 includes a block 110 of suitable material (plastic or metal) having walls forming a passageway 111, input and output ports 112 and 114 to the passageway, wells 116 and 118 for a differential pressure transducer 120 and temperature transducer 122, and passageways 124 and 126 leading from pressure ports 128 and 130 to opposing sides of the differential pressure transducer 120. The pressure ports 128 and 130 are in open communication with the passageway and form, respectively, the beginning and ending points of a segment of the line. The length of the passageway between the pressure ports provides the line segment of known length and size. A suitable differential pressured transducer is a 16PC050F manufactured by Microswitch Division, Honeywell Instruments Inc.

Figure 3:
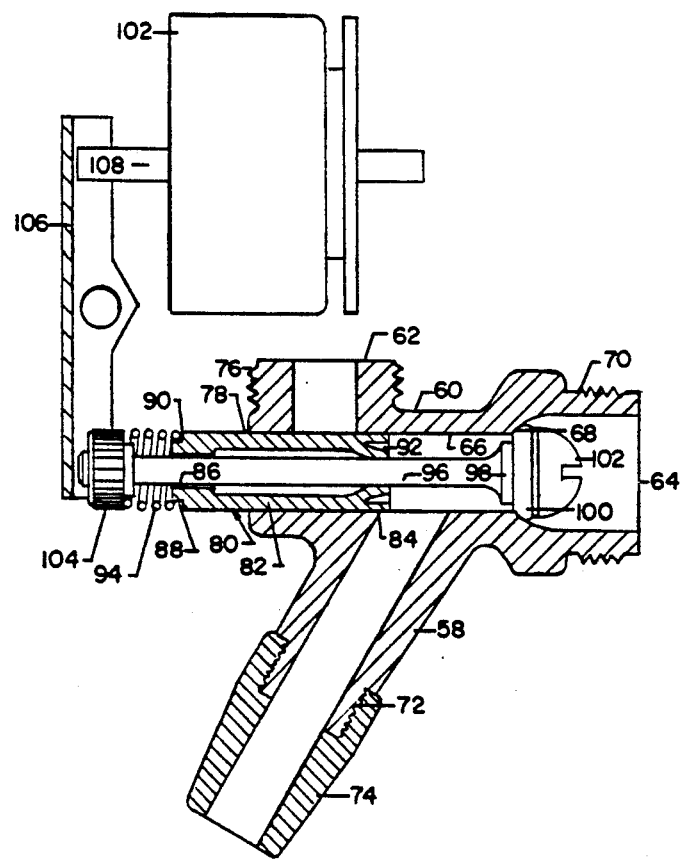
FIG. 3 is an enlarged sectional view of the faucet shown in FIG. 2.

In operation the passageway input and output ports 112 and 114 are connected, respectively, to the beer keg for admitting beer under pressure to the passageway and to the stanchion 14. The beer travels through the passageway to the first pressure port 128 where it provides the pressure through the pressure port 128 and passageway 124 to one side of the differential pressure transducer 120, and then through the known length of the passageway 111 to the second pressure port 130 where it provides the pressure through the second pressure port 130 through the passageway 126 to an opposing side of the differential pressure transducer. The pressurized beer then flows out the output port 114 through the flexible tube 20 to the faucet 22. The differential pressure transducer 120 outputs an analog signal indicative of the difference in pressure of the beer between the beginning and ending pressure ports 128 and 130 over leads 132 (FIG. 2) to the programmable controller (FIG. 3). The temperature transducer 122 outputs an analog signal indicative of the temperature through lead 134 to the programmable controller.

Figure 5:
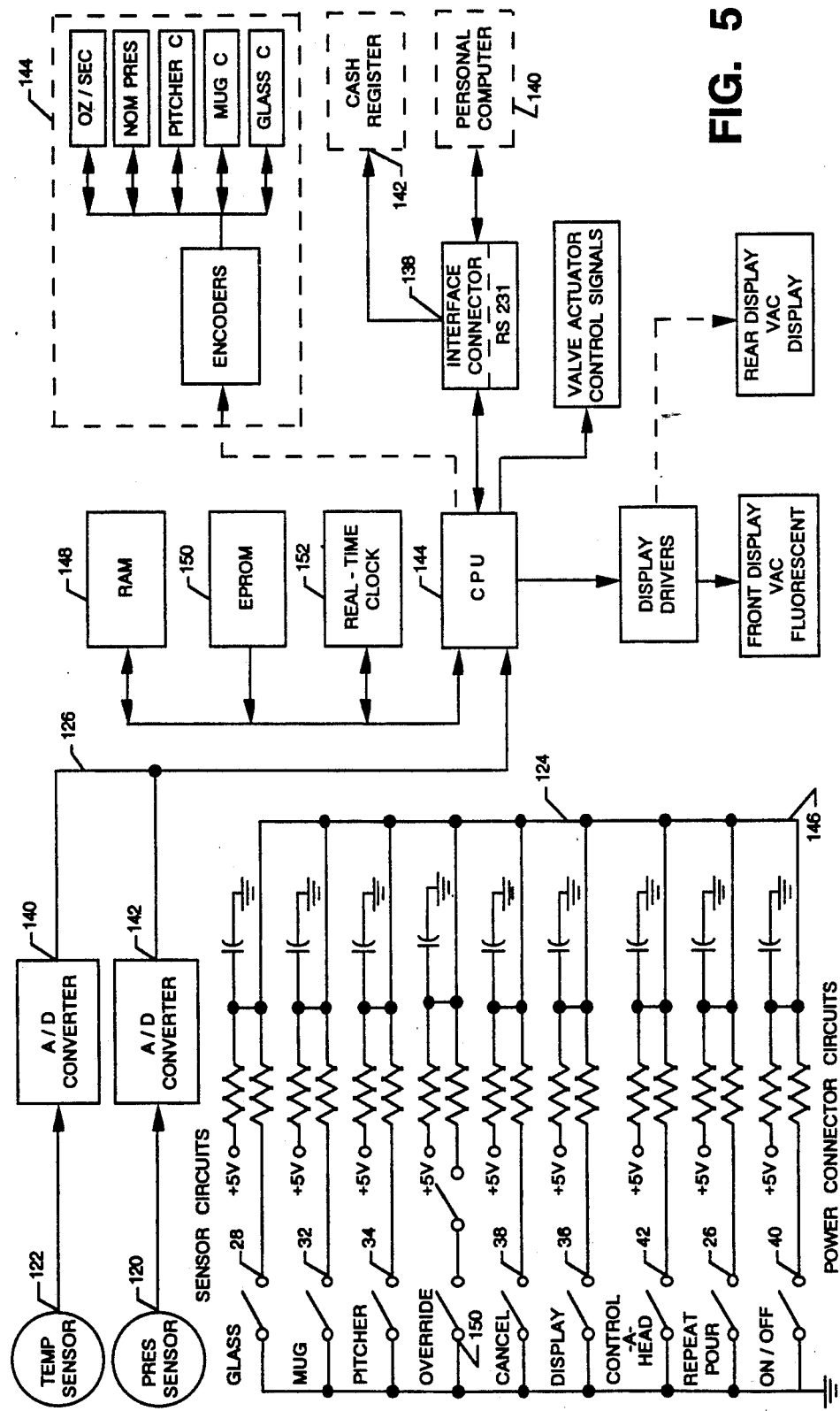
FIG. 5 is a block diagram of the programmable controller.

Referring now to FIG. 5, the programmable controller 30 includes analog to digital (A/D) converters 140 and 142 for converting, respectively, the pressure difference and temperature indicating signals to digital signals for a central processing unit 144 (CPU). A typical CPU is an 8031 microprocessor manufactured by Intel corporation. A plurality of power connector circuits 146 connect the front panel button switches and on/off/purge switches to the CPU 144.

The CPU 144 is connected to a random access memory (RAM) 148, an erasable programmable read only memory (EPROM) 150, and real time clock 152. The RAM receives and stores the digitized differential pressure and temperature signals together with other information for readout by the CPU. The information may include the count, prices for the glasses, mugs, and pitchers, and amount of each sales, if that feature is provided. The EPROM provides permanent storage of the programs and information such as the system operating parameters for readout. The EPROM contains a look up table for use in determining the proper dispensing flow rate for filling the beverage containers, which for beer include glasses, mugs, or pitchers. The look up table includes differential pressure readings and their corresponding rates of flow for the line segment and liquid (beer) known to be flowing therein. The Eprom contains the programmed instructions for converting the flow rate to the amounts of beer necessary to pour a preselected quantity of the liquid. The CPU fetches the differential pressure measurements from the RAM and EPROM for comparison in the comparator and receiving the corresponding flow rate. The CPU then accumulates the incremental quantities of beer being poured until the accumulated quantity compares to the selected programmed quantity. When the accumulated total quantity compares with the programmed quantity the CPU activates the valve actuating solenoid to terminate the pouring cycle.

During the pouring operation, the CPU is programmed to take additional differential pressure measurements readings at preselected intervals and compute new flow rates for new time periods. Thus, highly accurate quantities are dispensed using a large number of precise measurements of flow rate over very short time intervals and adding the minute quantities over a longer period of time.

Although only a single embodiment of the invention has been disclosed, it will be apparent to a person skilled in the art that various modifications to the details of construction shown and described may be made without departing from the scope of this invention.

What is claimed is:

1. A computerized beverage dispensing system comprising:
   a first connector means for connection to a pressurized source of beverage;
   a flow meter means connected to the first connector means and having a preselected passageway length for providing a substantially increased pressure difference for measuring differential pressures of the beverage flowing there through and outputting signals representative thereof;
   a faucet means connected to the flow meter means including walls forming a passageway for dispensing the beverage;
   a valve assembly means connected to the faucet means for opening and closing the passageway;
   an electromechanical valve assembly actuator means connected to the valve assembly means for operating the valve assembly means; and
   a programmable controller including a first means connected to the flow meter means for receiving the differential pressure signals, second means responsive to the differential pressure signals for generating quantity amounts of the beverage for a duration necessary to dispense a preselected amount of the beverage and a third means for connecting a cut off signal to the electromechanical valve assembly actuator means when the preselected amount of beverage has been poured for controlling the valve assembly means to dispense the preselected amount of beverage through the faucet means.

2. A computerized beverage dispensing system according to claim 1 wherein the flow meter includes walls of known material forming a first passageway having a preselected size, first and second ports formed in the passageway, respectively, at beginning and ending points for defining a preselected length of the passageway, walls connected to the first and second ports for forming second and third passageways for measuring the pressures of the beverage flowing in the first passageway at the first and second ports, and a pressure differential measuring means connected to the second and third passageways for measuring the pressure difference between the second and third passageways and outputting electrical signals indicative thereof.

3. A computerized beverage dispensing system according to claim 2 wherein the flow meter includes a block of known material having walls forming the first, second, and third passageways, and a well for the pressure differential measuring means.

4. A computerized beverage dispensing system according to claim 3 wherein the walls of the block of known material further form a well for a beverage temperature transducer.

5. A computerized beverage dispensing system according to claim 4 further including a beverage temperature transducer mounted in the well for outputting electrical signals indicative of the beverage temperature for the programmable controller.

6. A computerized beverage dispensing system according to claim 2 wherein the pressure differential measuring means is a pressure differential measuring device.

7. A computerized beverage dispensing system according to claim 6 wherein the pressure differential measurement device is a differential pressure transducer.

8. A computerized beverage dispensing system according to claim 1 wherein the valve assembly means includes:

a valve stem having first and second ends and a body portion there between;

a faucet passageway closing means connected to the first end of the valve stem; and a seal assembly means including a sealing sleeve means for receiving the body portion of the valve stem and having first and second ends and a body portion there between, said first end of the sleeve means being attached to the faucet intermediate ends of the faucet passageway, a seal expander means attached to the first end of the sleeve, said first end of the sleeve means coacting with the seal expander means and body portion of the valve stem for forming a substantially permanent barrier against seepage of the beverage into the sleeve means by wiping the beverage from the stem body surface as it passes through the sealing means during valve closing; and a valve opening and closing means adjacent the second end of the valve stem for operating the faucet passageway closing means.

9. A computerized beverage dispensing system according to claim 8 wherein the sleeve means further includes a valve stem guide means adjacent to the second end thereof.

10. A computerized beverage dispensing system according to claim 8 wherein the second end of the sleeve means further includes a valve spring support for supporting an end of a valve spring.

11. A computerized beverage dispensing system according to claim 10 wherein the valve assembly means further includes a valve spring having a first end mounted on the valve spring support of the sleeve means, and a spring retainer means connected to the second end of the valve stem and coacting with spring support of the the sleeve means for retaining the valve spring in operative association with the valve stem for closing the faucet passageway closing means.

* * * * *